(12) United States Patent
Uno et al.

(10) Patent No.: US 7,049,772 B2
(45) Date of Patent: May 23, 2006

(54) MOTOR DRIVE CIRCUIT

(75) Inventors: Juichi Uno, Gunma (JP); Kazuyoshi Ishikawa, Gunma (JP)

(73) Assignee: Sanyo Electric Co., Ltd., Osaka (JP)

(*) Notice: Subject to any disclaimer, the term of this patent is extended or adjusted under 35 U.S.C. 154(b) by 51 days.

(21) Appl. No.: 10/901,287

(22) Filed: Jul. 29, 2004

(65) Prior Publication Data

US 2005/0029973 A1    Feb. 10, 2005

(30) Foreign Application Priority Data

Jul. 30, 2003  (JP)  ............................. 2003-203749

(51) Int. Cl.
*H02P 6/08*    (2006.01)

(52) U.S. Cl. ...................... 318/293; 318/285; 318/452; 318/484

(58) Field of Classification Search ................ 318/256, 318/280, 281, 283, 285, 293, 445, 452, 484
See application file for complete search history.

(56) References Cited

U.S. PATENT DOCUMENTS

| | | | |
|---|---|---|---|
| 5,309,347 A * | 5/1994 | Poma et al. | 363/63 |
| 5,343,382 A * | 8/1994 | Hale et al. | 363/98 |
| 5,574,344 A * | 11/1996 | Matsuoka et al. | 318/293 |
| 5,666,035 A * | 9/1997 | Basire et al. | 318/254 |
| 5,831,403 A * | 11/1998 | Kanki et al. | 318/286 |
| 5,936,371 A * | 8/1999 | Bolash et al. | 318/685 |
| 6,114,826 A * | 9/2000 | Nishiura et al. | 318/685 |
| 6,501,609 B1 * | 12/2002 | Saito et al. | 360/61 |
| 6,563,284 B1 * | 5/2003 | Teutsch et al. | 318/599 |

FOREIGN PATENT DOCUMENTS

JP    2002-272162    9/2002

* cited by examiner

*Primary Examiner*—Bentsu Ro
(74) *Attorney, Agent, or Firm*—Fish & Richardson P.C.

(57) ABSTRACT

A motor drive circuit which have a first source-side transistor and a first sink-side transistor connected in series; a second source-side transistor and a second sink-side transistor connected in series; and a control circuit supplying the first source-side transistor, the first sink-side transistor, the second source-side transistor, and the second sink-side transistor with control signals for supplying a current in one direction or the opposite direction to a coil connected between a connection point of the first source-side transistor and the first sink-side transistor and a connection point of the second source-side transistor and the second sink-side transistor based on a plurality of input signals that complementarily change at a predetermined frequency. The control circuit, during each time period between timings of complementary switching of the plurality of input signals, outputs control signals for turning on and off the transistors in a predetermined manner.

5 Claims, 5 Drawing Sheets

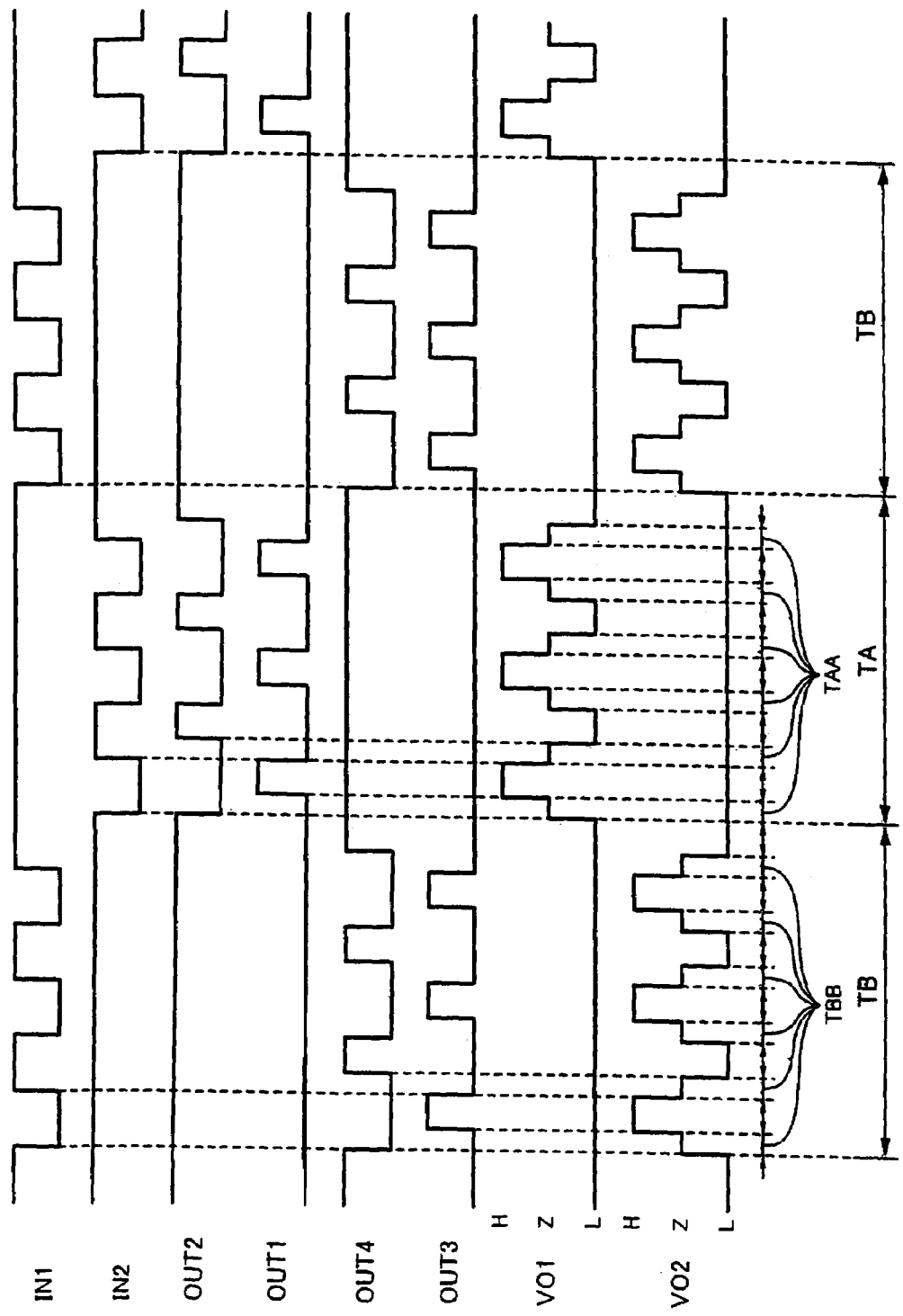

MOTOR DRIVE CIRCUIT

CROSS-REFERENCE TO RELATED APPLICATIONS

The present application claims priority upon Japanese Patent Application No. 2003-203749 filed on Jul. 30, 2003, which is herein incorporated by reference.

BACKGROUND OF THE INVENTION

1. Field of the Invention

The present invention relates to a motor drive circuit.

2. Description of the Related Art

A conventional motor drive circuit will be explained with reference to FIGS. 4, 5, and 6. FIG. 4 is a circuit block diagram showing a usual motor drive circuit. FIG. 5 is a circuit diagram showing a PWM circuit of a synchronous rectification type provided in the motor drive circuit of FIG. 4. FIG. 6 is a waveform diagram showing essential waveforms for FIG. 4. It is assumed that in the prior art, the motor drive circuit except the coil is an integrated circuit where bipolar transistors and CMOS transistors are mixed and integrated on the same chip. Furthermore, in the motor drive circuit, the source-side transistors and the sink-side transistors connected to the coil are supplied with control signals output from the PWM circuit so as to operate.

For an NPN-type bipolar transistor 2 (first source-side transistor) and an NPN-type bipolar transistor 4 (first sink-side transistor), the collector-emitter paths thereof are connected in series between a power supply VCC and ground VSS. Moreover, for an NPN-type bipolar transistor 6 (second source-side transistor) and an NPN-type bipolar transistor 8 (second sink-side transistor), the collector-emitter paths thereof are connected in series between the power supply VCC and ground VSS. Furthermore, a coil 14 is connected externally between a terminal 10 drawn out from the collector-emitter joint of the bipolar transistors 2, 4 and a terminal 12 drawn out from the collector-emitter joint of the bipolar transistors 6, 8. The bipolar transistors 2, 4, 6, 8 are turned on and off with control signals OUT1, OUT2, OUT3, and OUT4 supplied from the PWM circuit described later. That is, during the time period when the bipolar transistors 2, 8 are both on, a current in an R direction is supplied to the coil 14. In contrast, during the time period when the bipolar transistors 6, 4 are both on, a current in an L direction is supplied to the coil 14. And the bipolar transistors 2, 8 and the bipolar transistors 6, 4 operate complementarily, so that the current through the coil 14 changes in direction as required, and thereby the motor rotates in a predetermined direction.

A control circuit 16 outputs the control signals OUT1, OUT2, OUT3, and OUT4 for controlling on-off timing of the bipolar transistors 2, 4, 6, 8. The control circuit 16 has a PWM circuit 18 for rotating the motor at a predetermined speed. The PWM circuit 18 outputs the control signals OUT1, OUT2, OUT3, and OUT4 for making the bipolar transistors 2, 4, 6, 8 operate, based on input signals IN1, IN2 that change complementarily.

Because the motor drive circuit is a circuit where the bipolar transistors and CMOS transistors are mixed, the PWM circuit 18 is capable of outputting the control signals OUT1, OUT2, OUT3, and OUT4 for synchronously rectifying the bipolar transistors 2, 4, 6, 8. Specifically, when supplying a current in the R direction to the coil 14, the PWM circuit 18 outputs the control signals OUT1, OUT2, OUT3, and OUT4 for turning the bipolar transistor 6 off, the bipolar transistor 8 on, and complementarily the bipolar transistors 2, 4 on and off. In contrast, when supplying a current in the L direction to the coil 14, the PWM circuit 18 outputs the control signals OUT1, OUT2, OUT3, and OUT4 for turning the bipolar transistor 2 off, the bipolar transistor 4 on, and complementarily the bipolar transistors 6, 8 on and off. And, by setting the speed at which the bipolar transistors 2, 4 and the bipolar transistors 6, 8 are each complementarily turned on and off as required, the motor rotates at a predetermined speed.

The PWM circuit 18 is constituted by, for example, IIL (Integrated Injection Logic). Note that the IIL is circuit technology wherein inverters made up of bipolar transistors are connected as needed so that the signal at the intersection of signal lines is a logical product. The above related art is described in, for example, Japanese Patent Laid-open Publication No. 2002-272162.

When the bipolar transistors 2, 4 and the bipolar transistors 6, 8 are each complementarily turned on and off, due to the characteristic of the coil 14, currents occurring between the power supply VCC and ground VSS pass through along the collector-emitter paths of the bipolar transistors 2, 4 and the bipolar transistors 6, 8, and thus the motor drive circuit may malfunction or be destroyed.

Hence, the PWM circuit 18 outputs the control signals OUT1, OUT2 having time periods TAA when the bipolar transistors 2, 4 are both off in a time period TA when the bipolar transistors 2, 4 are complementarily turned on and off, and in contrast, outputs the control signals OUT3, OUT4 having time periods TBB when the bipolar transistors 6, 8 are both off in a time period TB when the bipolar transistors 6, 8 are complementarily turned on and off. By this means, the impedances of terminals 10, 12, to which the coil 14 is connected, become infinite (Z) during time periods TAA and TBB, and thus currents do not pass through along the collector-emitter paths of the bipolar transistors 2, 4 and the bipolar transistors 6, 8.

However, a plurality of time periods TAA exist in time period TA and also a plurality of time periods TBB exist in time period TB, and hence, as the speed at which the bipolar transistors 2, 4 and the bipolar transistors 6, 8 are each complementarily turned on and off becomes higher, it becomes harder to ignore time periods TAA and TBB. Therefore, there is the problem that the conventional motor drive circuit is unsuitable for the specification that the bipolar transistors 2, 4 and the bipolar transistors 6, 8 are each complementarily turned on and off at high speed (PWM-driven at high speed).

SUMMARY OF THE INVENTION

Accordingly, an object of the present invention is to provide a motor drive circuit capable of turning on and off the source-side transistors or the sink-side transistors connected to a coil at high speed.

According to the essence of the invention for solving the above problem, there is provided a motor drive circuit which have a first source-side transistor and a first sink-side transistor connected in series; a second source-side transistor and a second sink-side transistor connected in series; and a control circuit supplying the first source-side transistor, the first sink-side transistor, the second source-side transistor, and the second sink-side transistor with control signals for supplying a current in one direction or the opposite direction to a coil connected between a connection point of the first source-side transistor and the first sink-side transistor and a connection point of the second source-side transistor and the second sink-side transistor based on a plurality of input signals that complementarily change at a predetermined frequency, wherein the control circuit, during each time period between timings of complementary switching of the plurality of input signals, outputs control signals for holding two to-operate transistors turned off for a predetermined time, which transistors are either the first source-side transistor and the second sink-side transistor or the second source-side transistor and the first sink-side transistor, and then, while holding one transistor of the two to-operate transistors turned on all the time, turning on and off the other transistor at timings when one of the input signals changes at a predetermined frequency, which transistors are either the first source-side transistor and the second sink-side transistor or the second source-side transistor and the first sink-side transistor.

This motor drive circuit, during time periods between timings of complementary switching of the plurality of input signals, holds two to-operate transistors turned off for a predetermined time, and then, while holding one transistor of the two to-operate transistors turned on all the time, turns on and off the other transistor at timings when one of the input signals changes at a predetermined frequency. Hence, a motor drive circuit can be provided which implements high speed PWM drive.

Features and objects of the present invention other than the above will become clear by reading the description of the present specification with reference to the accompanying drawings.

BRIEF DESCRIPTION OF THE DRAWINGS

For a more complete understanding of the present invention and the advantages thereof, reference is now made to the following description taken in conjunction with the accompanying drawings wherein:

FIG. 6 is a waveform diagram showing the essential waveforms for FIG. 4.

DETAILED DESCRIPTION OF THE INVENTION

At least the following matters will be made clear by the explanation in the present specification and the description of the accompanying drawings.

Configuration of a PWM Circuit

Figure 1:
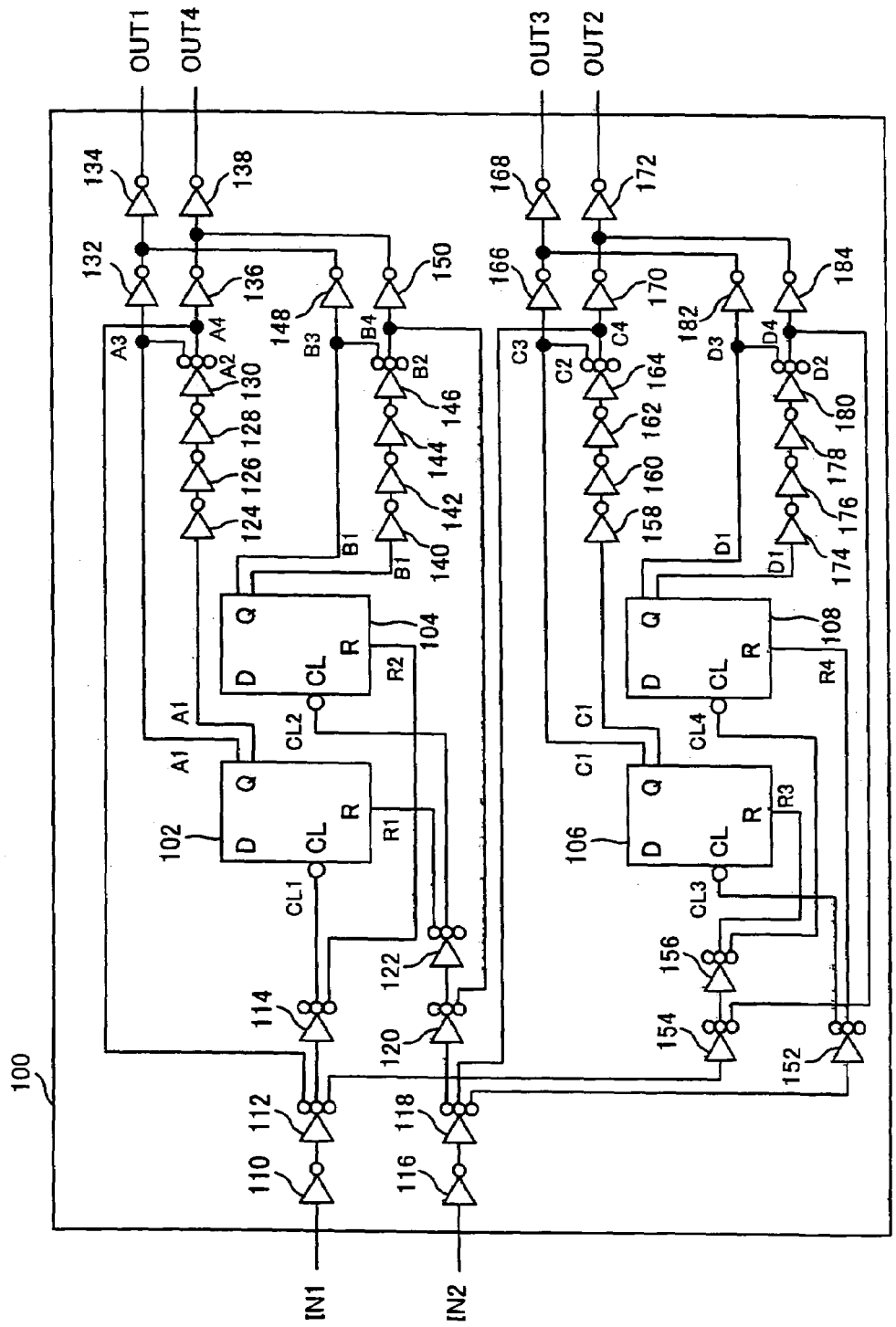
FIG. 1 is a circuit diagram showing an example of a PWM circuit (control circuit) used in a motor drive circuit of the present invention.
Figure 4:
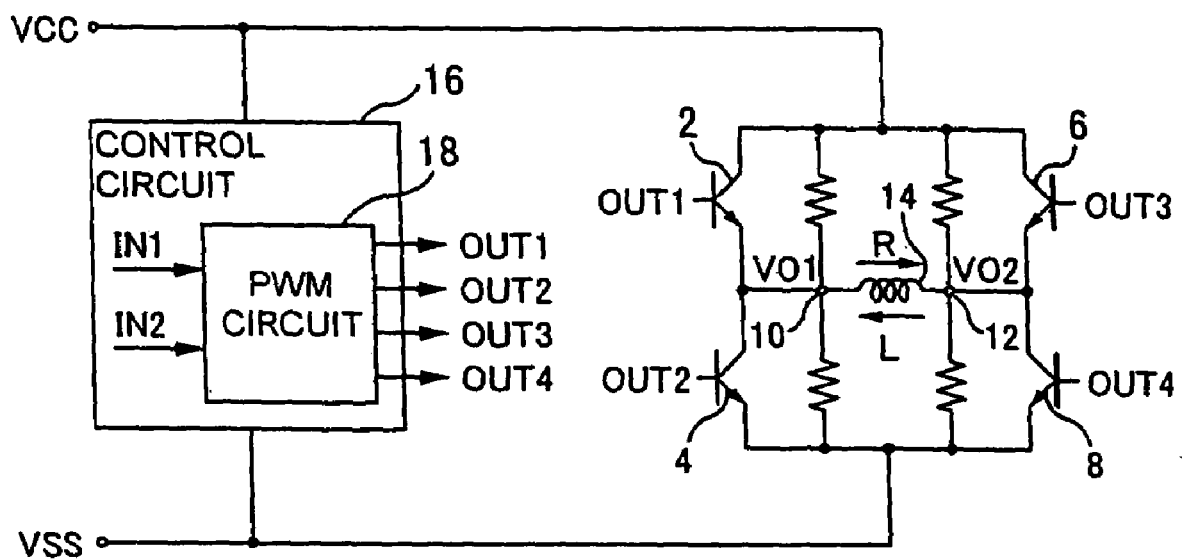
FIG. 4 is a circuit block diagram showing a usual motor drive circuit.
Figure 5:
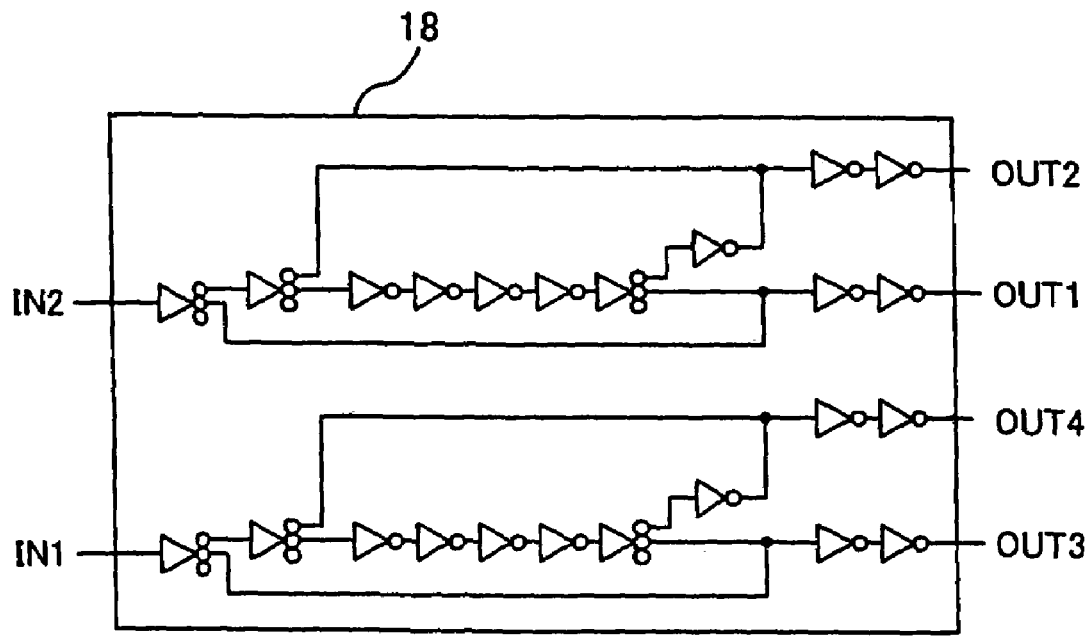
FIG. 5 is a circuit diagram showing a synchronous-rectification-type PWM circuit provided in the motor drive circuit of FIG. 4.

A PWM circuit used in a motor drive circuit of the present invention will be described with reference to FIG. 1. FIG. 1 is a circuit diagram showing an example of the PWM circuit (control circuit) used in the motor drive circuit of the present invention. In the present embodiment, it is assumed that the motor drive circuit of FIG. 4 is an integrated circuit made up of bipolar transistors and that the PWM circuit of FIG. 1 is constituted by, for example, IIL and used in the motor drive circuit of FIG. 4.

The PWM circuit 100 comprises a D flip-flop 102 (first flip-flop) and a D flip-flop 104 (second flip-flop) for outputting control signals OUT1, OUT4 from input signals IN1, IN2 (first and second input signals), and a D flip-flop 106 (third flip-flop) and a D flip-flop 108 (fourth flip-flop) for outputting control signals OUT3, OUT2 from the input signals IN1, IN2.

First, the CL (clock) terminal of the D flip-flop 102 is connected via three inverters 110, 112, 114 to the input signal IN1 terminal, and the D flip-flop 102 operates at the falling timing of a signal CL1 (inverted signal of input signal IN1) output from the inverter 114. The R (reset) terminal of the D flip-flop 102 is connected via four inverters 116, 118, 120, 122 to the input signal IN2 terminal, and the D flip-flop 102 is reset at the rising timing of a signal R1 (non-inverted signal of input signal IN2) output from the inverter 122. The Q (output) terminal of the D flip-flop 102 has two signal lines, and the D flip-flop 102 outputs a rectangular signal A1 that changes at the timings when the input signals IN1, IN2 complementarily switch. One signal line of the Q terminal of the D flip-flop 102 is connected to four inverters 124, 126, 128, 130, and the inverter 130 outputs a delayed signal A2 produced by delaying one type of edges of rectangular signal A1 just by the signal transmission time (time period TX) of the inverters 124, 126, 128, 130. The other signal line of the Q terminal of the D flip-flop 102 is connected to an output of the inverter 130 and also via two inverters 132, 134 to the terminal of the control signal OUT1. The inverter 134 outputs a logical product signal A3 of rectangular signal A1 and delayed signal A2 as the control signal OUT1. An output of the inverter 112 is connected to an output of the inverter 130 and also via two inverters 136, 138 to the terminal of the control signal OUT4, and a logical product signal A4 of input signal IN1 and delayed signal A2 is output as the control signal OUT4.

The CL terminal of the D flip-flop 104 is connected via the four inverters 116, 118, 120, 122 to the input signal IN2 terminal, and the D flip-flop 104 operates at the falling timing of a signal CL2 (=signal R1) output from the inverter 122. The R terminal of the D flip-flop 104 is connected via the three inverters 110, 112, 114 to the input signal IN1 terminal. The D flip-flop 104 is reset at the rising timing of a signal R2 (=signal CL1) output from the inverter 114. The Q terminal of the D flip-flop 104 has two signal lines, and the D flip-flop 104 outputs a rectangular signal B1 that changes at the timings when the input signals IN1, IN2 complementarily switch. One signal line of the Q terminal of the D flip-flop 104 is connected to four inverters 140, 142, 144, 146, and the inverter 146 outputs a delayed signal B2 produced by delaying one type of edges of rectangular signal B1 just by the signal transmission time (time period TX) of the inverters 140, 142, 144, 146. The other signal line of the Q terminal of the D flip-flop 104 is connected to an output of the inverter 146 and also via two inverters 148, 134 to the terminal of the control signal OUT1. The inverter 134 outputs a logical product signal B3 of rectangular signal B1 and delayed signal B2 as the control signal OUT1. An output of the inverter 120 is connected to an output of the inverter 146 and also via two inverters 150, 138 to the terminal of the control signal OUT4, and a logical product signal B4 of an inverted signal of input signal IN2 and delayed signal B2 is output as the control signal OUT4.

The CL terminal of the D flip-flop 106 is connected via three inverters 116, 118, 152 to the input signal IN2 terminal, and the D flip-flop 106 operates at the falling timing of a signal CL3 (inverted signal of input signal IN2) output from the inverter 152. The R terminal of the D flip-flop 106 is connected via four inverters 110, 112, 154, 156 to the input signal IN1 terminal, and the D flip-flop 106 is reset at the rising timing of a signal R3 (non-inverted signal of input signal IN1) output from the inverter 156. The Q terminal of the D flip-flop 106 has two signal lines, and the D flip-flop 106 outputs a rectangular signal C1 that changes at the timings when the input signals IN1, IN2 complementarily switch. One signal line of the Q terminal of the D flip-flop 106 is connected to four inverters 158, 160, 162, 164, and the inverter 164 outputs a delayed signal C2 produced by delaying one type of edges of rectangular signal C1 just by the signal transmission time (time period TX) of the inverters 158, 160, 162, 164. The other signal line of the Q terminal of the D flip-flop 106 is connected to an output of the inverter 164 and also via two inverters 166, 168 to the terminal of the control signal OUT3. The inverter 168 outputs a logical product signal C3 of rectangular signal C1 and delayed signal C2 as the control signal OUT3. An output of the inverter 118 is connected to an output of the inverter 164 and also via two inverters 170, 172 to the terminal of the control signal OUT2, and a logical product signal C4 of input signal IN2 and delayed signal C2 is output as the control signal OUT2.

The CL terminal of the D flip-flop 108 is connected via the four inverters 110, 112, 154, 156 to the input signal IN1 terminal, and the D flip-flop 108 operates at the falling timing of a signal CL4 (=signal R3) output from the inverter 156. The R terminal of the D flip-flop 108 is connected via the three inverters 116, 118, 152 to the input signal IN2 terminal. The D flip-flop 108 is reset at the rising timing of a signal R4 (=signal CL3) output from the inverter 152. The Q terminal of the D flip-flop 108 has two signal lines, and the D flip-flop 108 outputs a rectangular signal D1 that changes at the timings when the input signals IN1, IN2 complementarily switch. One signal line of the Q terminal of the D flip-flop 108 is connected to four inverters 174, 176, 178, 180, and the inverter 180 outputs a delayed signal D2 produced by delaying one type of edges of rectangular signal D1 just by the signal transmission time (time period TX) of the inverters 174, 176, 178, 180. The other signal line of the Q terminal of the D flip-flop 108 is connected to an output of the inverter 180 and also via two inverters 182, 168 to the terminal of the control signal OUT3. The inverter 168 outputs a logical product signal D3 of rectangular signal D1 and delayed signal D2 as the control signal OUT3. An output of the inverter 154 is connected to an output of the inverter 180 and also via two inverters 184, 172 to the terminal of the control signal OUT2, and a logical product signal D4 of an inverted signal of input signal IN1 and delayed signal D2 is output as the control signal OUT2.

Note that the D flip-flop 102 and the inverters 110, 112, 114, 116, 118, 120, and 122 form a first circuit for outputting rectangular signal A1; the D flip-flop 104 and the inverters 110, 112, 114, 116, 118, 120, and 122 form a first circuit for outputting rectangular signal B1; the D flip-flop 106 and the inverters 110, 112, 116, 118, 152, 154, and 156 form a first circuit for outputting rectangular signal C1; and the D flip-flop 108 and the inverters 110, 112, 116, 118, 152, 154, and 156 form a first circuit for outputting rectangular signal D1. Furthermore, the connection of the D flip-flop 102 and the inverter 130 forms a second circuit for outputting logical product signal A3; the connection of the D flip-flop 104 and the inverter 146 forms a second circuit for outputting logical product signal B3; the connection of the D flip-flop 106 and the inverter 164 forms a second circuit for outputting logical product signal C3; the connection of the D flip-flop 108 and the inverter 180 forms a second circuit for outputting logical product signal D3. Moreover, the connection of the inverters 112, 130 forms a third circuit for outputting logical product signal A4; the connection of the inverters 120, 146 forms a third circuit for outputting logical product signal B4; the connection of the inverters 118, 164 forms a third circuit for outputting logical product signal C4; and the connection of the inverters 154, 180 forms a third circuit for outputting logical product signal D4.

Note that the PWM circuit 100 is a hardware circuit that outputs the control signals based on a minimum number of two input signals. Hence, the PWM circuit 100 with the simple configuration can certainly output the control signals corresponding to the input signals. Furthermore, the motor drive circuit having the PWM circuit 100 can be integrated.

Operation of the PWM Circuit

<<One Specification of the Input Signals>>

Figure 2:
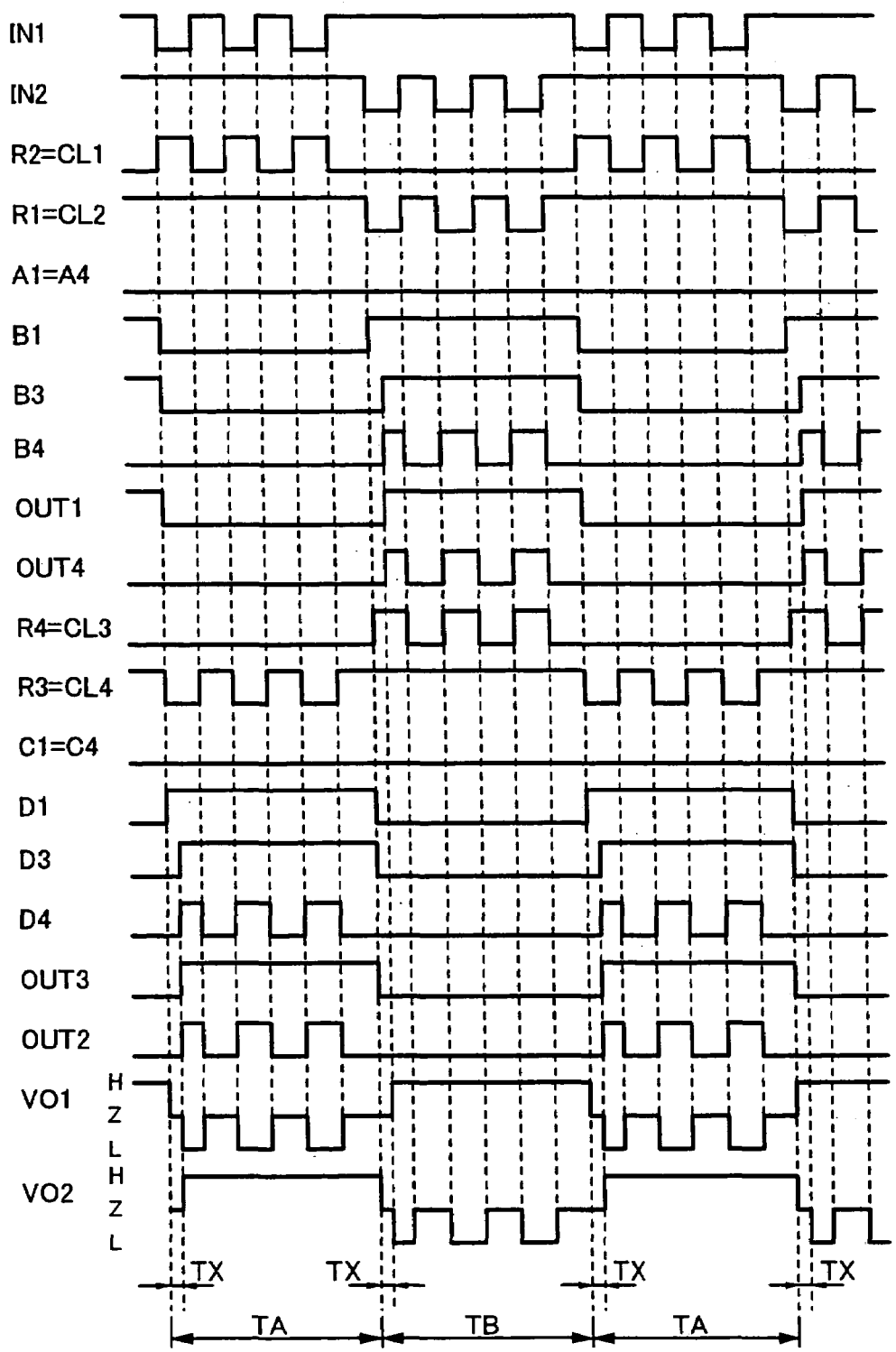
FIG. 2 is a waveform diagram showing essential waveforms for FIG. 1.

The operation of the PWM circuit used in the motor drive circuit of the present invention will be explained with reference to FIGS. 1, 2, and 4. FIG. 2 is a waveform diagram showing essential waveforms for FIG. 1. Note that in the waveforms of FIG. 2, the input signals IN1, IN2 complementarily repeat variations at a predetermined frequency and being at a high level over time periods TA, TB.

First, during time period TA, the input signal IN1 changes rectangularly between a first voltage (e.g., 5 volts) and a second voltage (e.g., 0 volts) at a predetermined frequency, and the input signal IN2 is fixed at the first voltage (hereinafter, called a high level). Signal CL1 (=signal R2) becomes the inversion of the input signal IN1, and signal R1 (=signal CL2) becomes the high level. Although signal CL1 changes, the D flip-flop 102 is reset all the time because signal R1 is at the high level. Thus, signal A1 becomes the second voltage (hereinafter, called a low level). At this time, signals A2, A3, A4 also become the low level. Furthermore, although signal R2 changes, the D flip-flop 104 does not operate by clock because signal CL2 is at the high level. Thus, signal B1 becomes the low level. At this time, signals B2, B3, B4 also become the low level. Thus, the control signals OUT1, OUT4 become the low level.

Meanwhile, signal CL3 (=signal R4) becomes the low level, and signal R3 (=signal CL4) becomes the non-inversion of the input signal IN1. Although signal R3 changes, the D flip-flop 106 does not operate by clock because signal CL3 is at the low level. Thus, signal C1 becomes the low level. At this time, signals C2, C3, C4 also become the low level. Furthermore, the D flip-flop 108 operates by clock at the timings when signal CL4 falls because signal R4 is at the low level. Thus, signal D1 becomes the high level. At this time, signal D3 becomes a signal produced by delaying the rising edge of signal D1 by time period TX from the start timing of time period TA. Signal D4 becomes a signal produced by delaying the rising edge of an inverted signal of the input signal IN1 by time period TX from the start timing of time period TA. Thus, the control signal OUT3 becomes the same as signal D3, and the control signal OUT2 becomes the same as signal D4.

Since the control signals OUT1, OUT2, OUT3, and OUT4 have the above relationships, the bipolar transistor 4 is turned on and off at the predetermined frequency, while the bipolar transistor 6 is turned on. And, during the time periods when the terminal 10 is at the low level (L) and the terminal 12 is at the high level (H), the coil 14 is supplied with a current in the L direction. Note that until time period TX has elapsed, the bipolar transistors 4, 6 are off and the impedances of the terminals 10, 12 are infinite (Z). After time period TX has elapsed, the bipolar transistors 4, 6 are turned on and off according to the changes of the control signals OUT2, OUT3. In particular, the bipolar transistor 4 is turned on and off just at the timings when the input signal IN1 changes.

Next, during time period TB, the input signal IN1 is fixed at the first voltage. The input signal IN2 changes rectangularly between the first voltage and the second voltage at the predetermined frequency. Signal CL1 (=signal R2) becomes the low level, and signal R1 (=signal CL2) becomes the non-inversion of the input signal IN2. Although signal R1 changes, the D flip-flop 102 does not operate by clock because signal CL1 is at the low level. Thus, signal A1 becomes the low level. At this time, signals A2, A3, A4 also become the low level. Furthermore, the D flip-flop 104 operates by clock at the timings when signal CL2 falls because signal R2 is at the low level. Thus, signal B1 becomes the high level. At this time, signal B3 becomes a signal produced by delaying the rising edge of signal B1 by time period TX from the start timing of time period TB. Signal B4 becomes a signal produced by delaying the rising edge of an inverted signal of the input signal IN2 by time period TX from the start timing of time period TA. Thus, the control signal OUT1 becomes the same as signal B3, and the control signal OUT4 becomes the same as signal B4.

Meanwhile, signal CL3 (=signal R4) becomes the inversion of the input signal IN2, and signal R3 (=signal CL4) becomes the high level. Although signal CL3 changes, the D flip-flop 106 is reset all the time because signal R3 is at the high level. Thus, signal C1 becomes the low level. At this time, signals C2, C3, C4 also become the low level. Furthermore, although signal R4 changes, the D flip-flop 108 does not operate by clock because signal CL4 is at the high level. Thus, signal D1 becomes the low level. At this time, signals D2, D3, D4 also become the low level. Thus, the control signals OUT3, OUT2 become the low level.

Since the control signals OUT1, OUT2, OUT3, and OUT4 have the above relationships, while the bipolar transistor 2 is turned on, the bipolar transistor 8 is turned on and off at the predetermined frequency. And, during the time periods when the terminal 10 is at the high level (H) and the terminal 12 is at the low level (L), the coil 14 is supplied with a current in the R direction. Note that until time period TX has elapsed, the bipolar transistors 2, 8 are off and the impedances of the terminals 10, 12 are infinite (Z). After time period TX has elapsed, the bipolar transistors 2, 8 are turned on and off according to the changes of the control signals OUT1, OUT4. In particular, the bipolar transistor 8 is turned on and off just at the timings when the input signal IN2 changes.

<<Another Specification of the Input Signals>>

Figure 3:
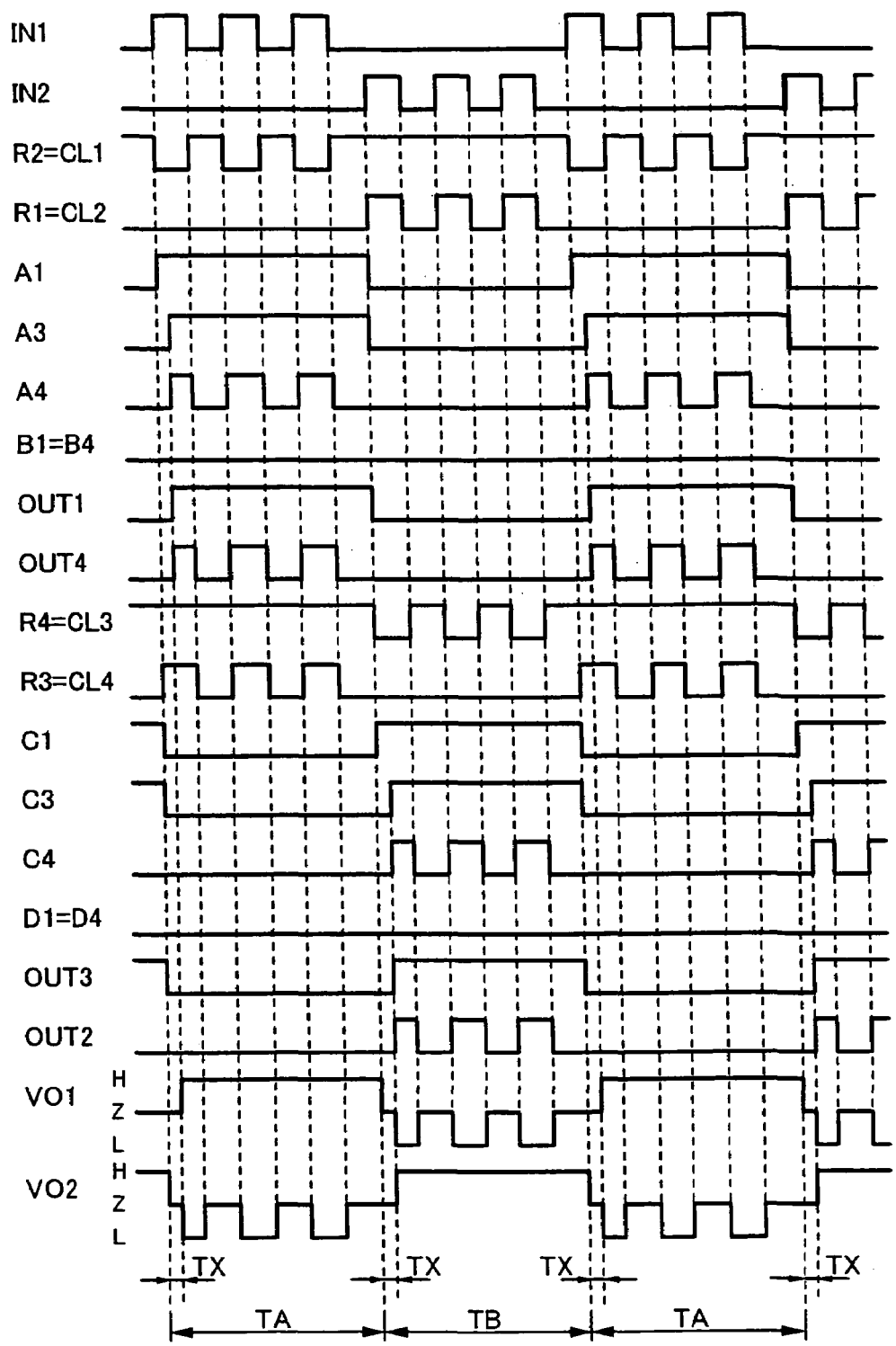
FIG. 3 is a waveform diagram showing essential waveforms for FIG. 1.

The operation of the PWM circuit used in the motor drive circuit of the present invention will be explained with reference to FIGS. 1, 3, and 4. FIG. 3 is a waveform diagram showing essential waveforms for FIG. 1. Note that in the waveforms of FIG. 3, the input signals IN1, IN2 complementarily repeat variations at a predetermined frequency and being at a low level over time periods TA, TB.

First, during time period TA, the input signal IN1 changes rectangularly between a first voltage and a second voltage at a predetermined frequency, and the input signal IN2 is fixed at the second voltage (hereinafter, called a low level). Signal CL1 (=signal R2) becomes the inversion of the input signal IN1, and signal R1 (=signal CL2) becomes the low level. The D flip-flop 102 operates by clock at the timings when signal CL1 falls because signal R1 is at the low level. Thus, signal A1 becomes a high level. At this time, signal A3 becomes a signal produced by delaying the rising edge of signal A1 by time period TX from the start timing of time period TA. Signal A4 becomes a signal produced by delaying the rising edge of the input signal IN1 by time period TX from the start timing of time period TA. Thus, the control signal OUT1 becomes the same as signal A3, and the control signal OUT4 becomes the same as signal A4.

Meanwhile, signal CL3 (=signal R4) becomes the high level, and signal R3 (=signal CL4) becomes the non-inversion of the input signal IN1. Although signal R3 changes, the D flip-flop 106 does not operate by clock because signal CL3 is at the high level. Thus, signal C1 becomes the low level. At this time, signals C2, C3, C4 also become the low level. Furthermore, although signal CL4 changes, the D flip-flop 108 is reset all the time because signal R4 is at the high level. Thus, signal D1 becomes the low level. At this time, signals D2, D3, D4 also become the low level. Hence, the control signals OUT3, OUT2 become the low level.

Since the control signals OUT1, OUT2, OUT3, and OUT4 have the above relationships, while the bipolar transistor 2 is turned on, the bipolar transistor 8 is turned on and off at the predetermined frequency. And, during the time periods when the terminal 10 is at the high level (H) and the terminal 12 is at the low level (L), the coil 14 is supplied with a current in the R direction. Note that until time period TX has elapsed, the bipolar transistors 2, 8 are off and the impedances of the terminals 10, 12 are infinite (Z). After time period TX has elapsed, the bipolar transistors 2, 8 are turned on and off according to the changes of the control signals OUT1, OUT4. In particular, the bipolar transistor 8 is turned on and off just at the timings when the input signal IN1 changes.

Next, during time period TB, the input signal IN1 is fixed at the second voltage. The input signal IN2 changes rectangularly between the first voltage and the second voltage at the predetermined frequency. Signal CL1 (=signal R2) becomes the high level, and signal R1 (=signal CL2) becomes the non-inversion of the input signal IN2. Although signal R1 changes, the D flip-flop 102 does not operate by clock because signal CL1 is at the high level. Thus, signal A1 becomes the low level. At this time, signals A2, A3, A4 also become the low level. Furthermore, although signal R2 changes, the D flip-flop 104 does not operate by clock because signal CL2 is at the low level. Thus, signal B1 becomes the low level. At this time, signals B2, B3, B4 also become the low level. Thus, the control signals OUT1, OUT4 become the low level.

Meanwhile, signal CL3 (=signal R4) becomes the inversion of the input signal IN2, and signal R3 (=signal CL4) becomes the low level. The D flip-flop 106 operates by clock at the timings when signal CL3 falls because signal R3 is at the low level. Thus, signal C1 becomes the high level. At this time, signal C3 becomes a signal produced by delaying the rising edge of signal C1 by time period TX from the start timing of time period TB. Signal C4 becomes a signal produced by delaying the rising edge of the input signal IN2 by time period TX from the start timing of time period TA. Hence, the control signal OUT3 becomes the same as signal C3, and the control signal OUT2 becomes the same as signal C4.

Since the control signals OUT1, OUT2, OUT3, and OUT4 have the above relationships, the bipolar transistor 4 is turned on and off at the predetermined frequency, while the bipolar transistor 6 is turned on. And, during the time periods when the terminal 10 is at the low level (L) and the terminal 12 is at the high level (H), the coil 14 is supplied with a current in the L direction. Note that until time period TX has elapsed, the bipolar transistors 4, 6 are off and the impedances of the terminals 10, 12 are infinite (Z). After time period TX has elapsed, the bipolar transistors 4, 6 are turned on and off according to the changes of the control signals OUT2, OUT3. In particular, the bipolar transistor 4 is turned on and off just at the timings when the input signal IN2 changes.

Effects of the PWM Circuit

The bipolar transistors 2, 8 and the bipolar transistors 4, 6 are off for only time period TX when the input signals IN1, IN2 complementarily switch, that is, when switching between time periods TA and TB. By this means, the problem can be prevented that currents occurring between the power supply VCC and ground VSS pass through along the collector-emitter paths of the bipolar transistors 2, 4 and the bipolar transistors 6, 8 causing the motor drive circuit to malfunction or to be destroyed. Note that because the signal transmission time of the inverters is used as time period TX, time period TX can be set according to the specifications of the motor as required.

Moreover, after time period TX has elapsed, the bipolar transistors 4, 8 are turned on and off just at the timings when the input signals IN1, IN2 change. Hence, a motor (DC motor or the like) can be PWM-driven at high speed by use of the bipolar transistors.

In addition, the PWM circuit 100 operates by using the input signals IN1, IN2 of either of FIGS. 2 and 3. That is, the PWM circuit 100 operates regardless of their fixed level value in time periods other than the time periods when the input signal IN1, IN2 changes at a predetermined frequency. Hence, a motor drive circuit with high versatility can be provided.

Note that a first inverter comprises the inverters 110, 112, 114; a second inverter comprises the inverters 116, 118, 120, 122; a first delay circuit comprises the inverters 124, 126, 128, 130; and a second delay circuit comprises the inverters 140, 142, 144, 146. Moreover, a third inverter comprises the inverters 116, 118, 152; a fourth inverter comprises the inverters 110, 112, 154, 156; a third delay circuit comprises the inverters 158, 160, 162, 164; and a fourth delay circuit comprises the inverters 174, 176, 178, 180.

Other Embodiments

Although the motor drive circuit according to the present invention has been described, the embodiment of the invention described above is provided to facilitate the understanding of the present invention and not intended to limit the present invention. It should be understood that various changes and alterations can be made therein without departing from the spirit and scope of the present invention and that the present invention includes equivalents thereof.

<<Source-Side Transistors and Sink-Side Transistors>>

Although in the present embodiment the bipolar transistors 4, 8 on the sink side are turned on and off at a predetermined frequency, the present invention is not limited to this. For example, the bipolar transistors 2, 6 on the source side may be turned on and off at a predetermined frequency so as to PWM-drive a motor.

<<Control Circuit>>

In the present embodiment, the PWM circuit 100 provided in the control circuit 16 is not limited to that of FIG. 1. Because the PWM circuit 100 need only output the control signals OUT1, OUT2, OUT3, and OUT4 based on the input signals IN1, IN2, circuit technology other than IIL also can be used.

According to the present invention, the motor drive circuit is provided which can turn on and off source-side transistors or sink-side transistors connected to a coil at high speed.

What is claimed is:

1. A motor drive circuit which has a first source-side transistor and a first sink-side transistor connected in series; a second source-side transistor and a second sink-side transistor connected in series; and a control circuit supplying the first source-side transistor, the first sink-side transistor, the second source-side transistor, and the second sink-side transistor with control signals for supplying a current in one direction or the opposite direction to a coil connected between a connection point of the first source-side transistor and the first sink-side transistor and a connection point of the second source-side transistor and the second sink-side transistor based on a plurality of input signals that complementarily change at a predetermined frequency, wherein the control circuit, during each time period between timings of complementary switching of the plurality of input signals, outputs control signals for holding two to-operate transistors turned off for a predetermined time, which transistors are either the first source-side transistor and the second sink-side transistor or the second source-side transistor and the first sink-side transistor, and then, while holding one transistor of the two to-operate transistors turned on all the time, turning on and off the other transistor at timings when one of the input signals changes at a predetermined frequency, which transistors are either the first source-side transistor and the second sink-side transistor or the second source-side transistor and the first sink-side transistor.

2. A motor drive circuit according to claim 1, wherein the plurality of input signals include only a first input signal and a second input signal that changes complementarily with the first input signal.

3. A motor drive circuit according to claim 2, wherein from among time periods between timings of complementary switching of the plurality of input signals, during a time period when the first input signal is at a fixed level that is either of a high level and a low level, the second input signal changes at the predetermined frequency, and during a time period when the second input signal is at the fixed level, the first input signal changes at the predetermined frequency.

4. A motor drive circuit according to claim 3, wherein the control circuit comprises:

a first circuit that outputs a rectangular signal changing at timings when the first input signal and the second input signal complementarily switch;

a second circuit that delays one type of transitions of the rectangular signal by the predetermined time from respective ones of the timings; and a third circuit that delays a start of transitions at the predetermined frequency of the first input signal and the second input signal by the predetermined time from the respective timings, and drives, by the output signal of the second circuit, one transistor of the two to-operate transistors which are either the first source-side transistor and the second sink-side transistor or the second source-side transistor and the first sink-side transistor, while driving the other transistor by an output signal of the third circuit.

5. A motor drive circuit according to claim 3, wherein the control circuit comprises:

a first inverter having an odd, greater than one, number of stages and having the first input signal inputted;

a second inverter having an even, greater than one, number of stages and having the second input signal inputted;

a first flip-flop that operates by the output of the first inverter as a clock and is reset by the output of the second inverter;

a second flip-flop that operates by the output of the second inverter as a clock and is reset by the output of the first inverter;

a first delay circuit having the output of the first flip-flop inputted;

a second delay circuit having the output of the second flip-flop inputted;

a third inverter having an odd, greater than one, number of stages and having the second input signal inputted;

a fourth inverter having an even, greater than one, number of stages and having the first input signal inputted;

a third flip-flop that operates by the output of the third inverter as a clock and is reset by the output of the fourth inverter;

a fourth flip-flop that operates by the output of the fourth inverter as a clock and is reset by the output of the third inverter;

a third delay circuit having the output of the third flip-flop inputted; and a fourth delay circuit having the output of the fourth flip-flop inputted, and outputs control signals for controlling the first source-side transistor based on either a logical product output of the first flip-flop and the first delay circuit or a logical product output of the second flip-flop and the second delay circuit, controlling the second sink-side transistor based on either a logical product output of an even ordinal stage of the first inverter and the first delay circuit or a logical product output of an odd ordinal stage of the second inverter and the second delay circuit, controlling the second source-side transistor based on either a logical product output of the third flip-flop and the third delay circuit or a logical product output of the fourth flip-flop and the fourth delay circuit, and controlling the first sink-side transistor based on either a logical product output of an even ordinal stage of the third inverter and the third delay circuit or a logical product output of an odd ordinal stage of the fourth inverter and the fourth delay circuit.

* * * * *